May 3, 1955
R. W. STANLEY ET AL
2,707,668
METHOD AND APPARATUS FOR FLUID
TREATING YARN IN A HELICAL PATH
Filed Oct. 2, 1943
2 Sheets-Sheet 1
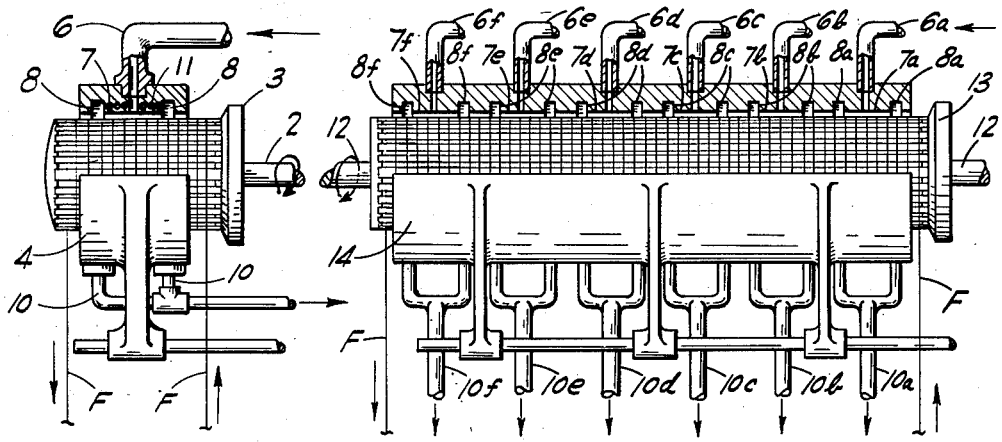
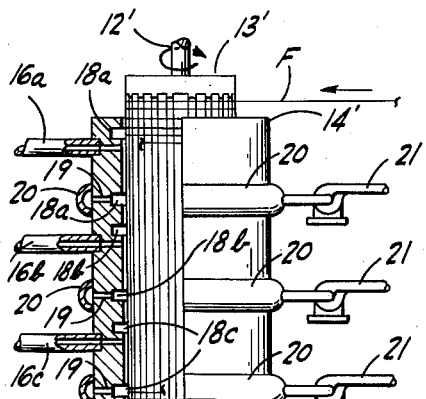
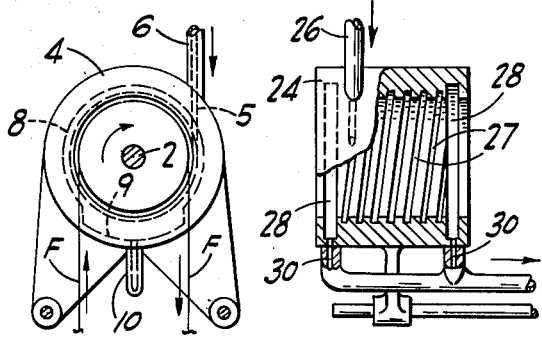
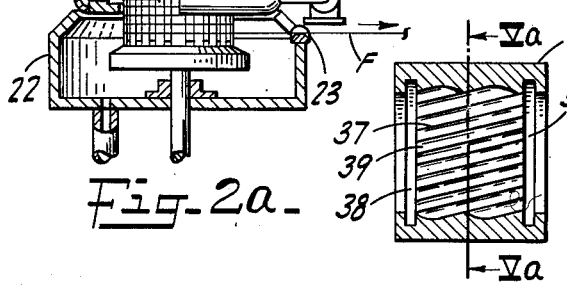
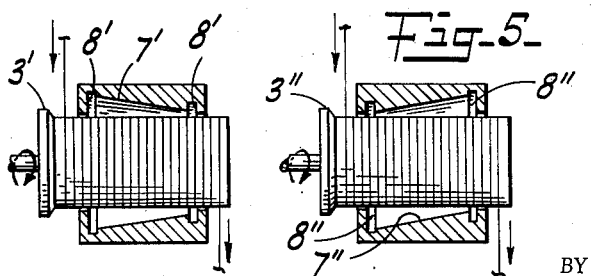
INVENTORS.
RICHARD W. STANLEY
WILLIAM B. LOWE
BY Carl A. Castellan
ATTORNEY.

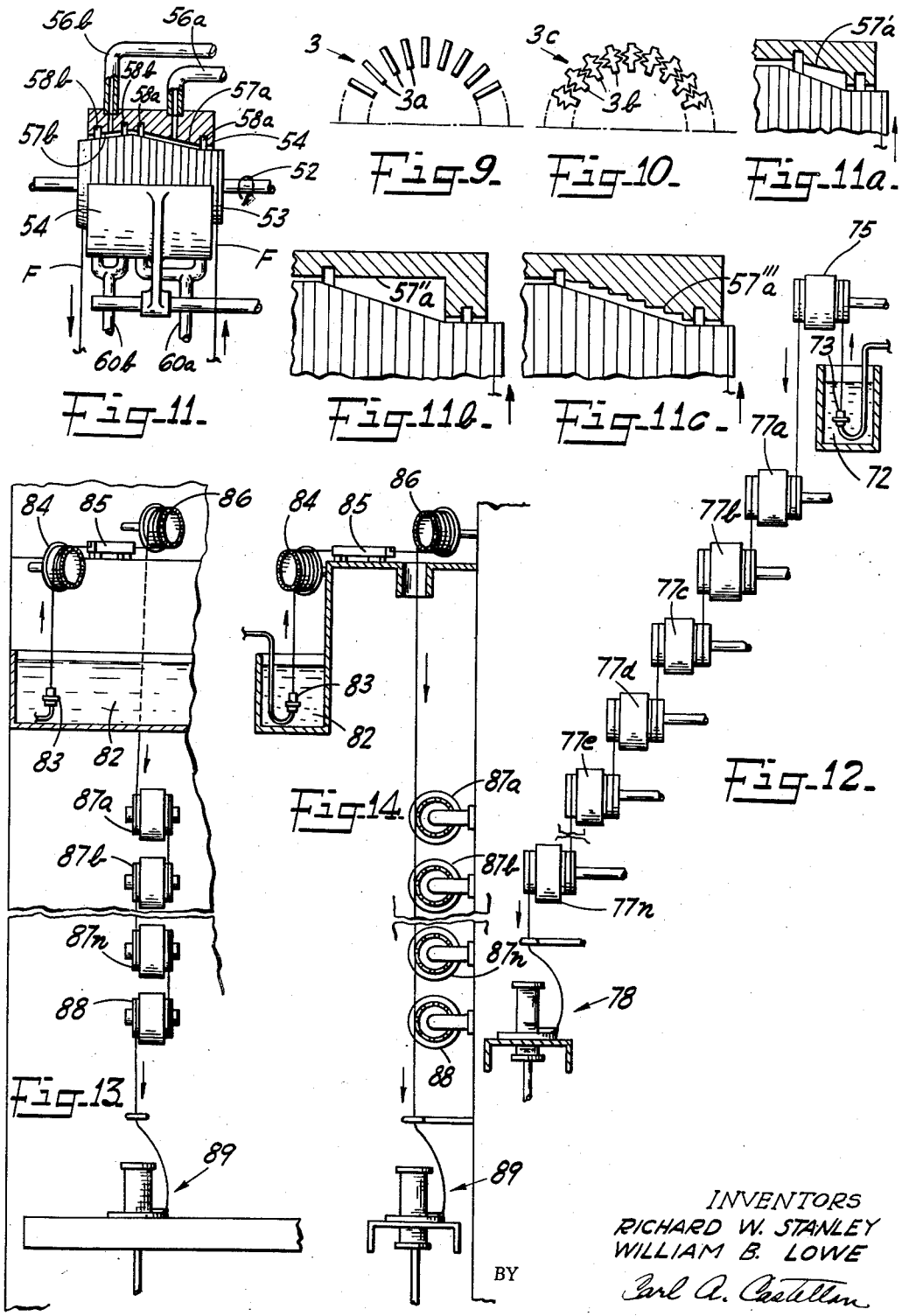

United States Patent Office 2,707,668
Patented May 3, 1955

2,707,668
METHOD AND APPARATUS FOR FLUID TREATING YARN IN A HELICAL PATH

Richard W. Stanley, Drexel Hill, and William B. Lowe, Chester, Pa., assignors to American Viscose Corporation, Wilmington, Del., a corporation of Delaware Application October 2, 1943, Serial No. 504,664

21 Claims. (Cl. 8—151.1)

This invention relates to methods and apparatus for the treatment of continuous filamentary material while continuously advancing through a generally helical path with liquids.

It has heretofore been suggested to apply liquids to filamentary material while passing the filamentary material through a generally helical path over some form of thread-storing, thread-advancing device or reel which is driven at a speed such that the liquid flows to the outer periphery of the device or reel without being thrown therefrom centrifugally.

In accordance with the present invention, liquid treatment of the filamentary material is effected by passing the material through a helical path over one or more thread-advancing devices or reels which are driven at sufficient speed to fling the liquid off the periphery of the device or reel and to force it through and about the filamentary material carried as a helix thereon by centrifugal force. A suitable deflector is provided about the periphery of the device or reel to cause the liquid to rebound and again contact the filamentary material. By operating in this manner, the efficiency of the liquid treatment is greatly increased, since the liquid is constantly being thrown off and on, and thereby caused to play upon, the filamentary material. This action causes rapid removal and replacement of the liquid in contact with the filamentary material and consequent reduction in the amount of liquid needed for a given processing operation. In addition, a thread-advancing device or reel of smaller diameter or size than heretofore possible may be used for a given linear peripheral speed of the filamentary material and when increased speeds of the filamentary material are desired, it is not necessary or desirable, as has been thought heretofore, to increase the diameter of the reel to prevent spraying of the liquid from the reel. For example, when operating reels under the conditions heretofore prevailing, the maximum linear speed of the filamentary material is about 70 meters per minute on a reel having a diameter of about 5½ inches, about 90 meters per minute on a reel of about 8 inches diameter, and about 100 meters per minute on a reel of 10 inches diameter. It is to be noted that a condition of diminishing returns occurs before the 10-inch reel is reached. This, however, is not the case when the technique of the present invention is used, since filamentary material may be handled at speeds of 125, 150, 200 or more meters per minute, regardless of reel diameter and subject only to the limitation of bursting tensile strength of the material itself at the time of and under the conditions of liquid treatment. Thus the invention gives rise to economy of liquid, equipment and space requirements.

In the drawings illustrative of the invention—

Figure 1 is a side elevation with the upper half in cross-section, showing a simple embodiment of the invention;

Figure 2 is a similar view showing a modification of the invention adapted for the application of a series of liquids at successive portions of a single thread-advancing device or reel;

Figure 2a is an elevation, partially in section, of a modification in which the helix is arranged on a vertical axis;

Figure 3 is an end view of the embodiment of Figure 1;

Figures 4, 5, 6, 7 and 8 show modifications of the surrounding deflector;

Figure 5a is a cross section on line Va—Va of Figure 5;

Figures 9 and 10 show traverse sections of modifications of the longitudinal bar members forming the thread-advancing reel or device;

Figures 11, 11a, 11b and 11c illustrate modified arrangements for effecting stretching of filamentary material while undergoing liquid treatment;

Figure 12 shows an end elevation of one adaptation for the spinning of artificial filaments; and Figures 13 and 14 show front and end elevations respectively of another adaptation for the spinning of artificial filament.

In Figures 1 and 3 there is shown rotatably mounted on shaft 2, a thread-storage, thread-advancing device in the form of a reel 3 of conventional design and generally comprising two sets of interdigitating spaced, longitudinally extending bar members which form a cage-like drum about the periphery of which the filamentary material F follows a generally helical path. While Figures 1 and 3 show a cantilever form of reel supported at one end only, any form of reel may be used, whether supported at one or both ends. A deflector, guard, or housing 4 surrounds the thread-advancing reel 3 with sufficient clearance to permit free passage of the filamentary material F riding on reel 3. A portion of the periphery of the device 3 is exposed adjacent each end of the helix of material F carried thereon to permit free passage of such material continuously to and from the device.

A passage 5 connected to a feed pipe 6 permits the delivery of liquids into the housing and to convolutions of the filamentary material in an intermediate zone on the reel. The passage 5 may be directed at any desired angle relative to the periphery of the reel, so that the liquid may be flowing in the same or opposite direction relative to the direction of travel of the bars of the reel where contact is first made. As shown, the passage 5 directs the liquid tangentially in the same direction as the direction of rotation of the reel bars. A greater amount of turbulence at the point of entrance may be obtained by directing the liquid at an angle inclined more toward a normal or toward a tangent directed opposite to the direction of rotation of the reel. The inside surface 7 of the housing serves to deflect the liquid thrown outwardly from the helix back upon the filamentary material and may be constituted of either a smooth, polished substantially cylindrical surface as shown or it may be roughened. Adjacent each end of the housing there is an annular liquid collecting groove 8, which may have its lower region more deeply recessed as at 9 to serve as a collecting drain for the liquid which descends under the influence of gravity. A discharge pipe 10 is connected to the bottom of the collecting system 8 and 9. A pump (not shown) may be provided for recirculating the liquids drained or removed from the system, and such liquids may be refreshed or fortified prior to such recirculation in conventional manner.

As shown, the passage 5 is approximately midway between the grooves 8. This may be varied considerably. Since the advancing action of the filamentary material over the reel 3 tends to favor displacement of the liquid toward the discharge end of the reel, the passage 5 may advantageously be arranged to deliver the liquid to the filamentary material much nearer to the receiving end of the reel than shown.

Instead of introducing the liquid, in the fashion shown in Figures 1 and 3, it may be introduced to the interior of the reel cage, such as by way of a bore within the axle or shaft by which or on which the reel is supported and rotated.

The clearance between the surface 7 and the filamentary material on the reel may be varied considerably with good results. The amount of latitude in this respect depends somewhat upon the nature of the surface 7, the character of the liquid being applied, and the speed of operation of the reel which influences the velocity of departure of the liquid from the filamentary material under the action of centrifugal force. Where the surface is rough in character, or a liquid is used which is low in viscosity and is freely broken into a spray, or the centrifugal force is such as to develop a high radial component of velocity of the departing liquid, this clearance may be of the order of one-half to one or two inches or more; whereas if the surface 7 is smooth, or a liquid is used which is viscous, or the departing liquid has a low radial component of velocity, smaller clearances of one-fourth inch or less may be necessary. Where small clearances are used, the action or playing of a liquid upon the filamentary material may involve simply the flow of a sheet or film of liquid filling the annular space between the deflector surface and the external periphery of the reel. Such is the case unless the liquid is introduced in insufficient amount to maintain such an annular sheet, in which event a turbulent wave action may set in as a transition between the simple annular sheet of liquid and the highly turbulent conditions in which the liquid thrown outwardly is splashed and sprayed back by the surrounding deflecting surface. For certain purposes, one type of action may be of more advantage than another. From the standpoint purely of economy in the use and pumping of liquid, the smaller ranges of clearance are generally preferable, but where less violent action is desirable because of the delicate character of a particular type of filamentary material, the larger clearance which is associated with a corresponding reduction of the force of the rebounding liquid spray on the material may be preferable.

The housing 4 preferably surrounds the desired treating zone of the reel completely. However, for certain purposes it may be desirable or even necessary to restrict the action of the liquid to only a portion of the periphery of a given zone of the reel. In this case, the deflecting means, such as the surface 7, may be provided only about a corresponding portion of the periphery of the reel, and the remaining portion of the periphery may be exposed or provided with a suitable housing or discharge receptacle or channel to catch the liquid thrown off in that region, without deflecting it back to the reel. As an example of this arrangement, the deflecting means 7, the collecting grooves 8, and the annular housing 4 may extend only 350° about the reel, the liquid being introduced between the surface 7 and the reel at a point adjacent the end of the housing where the reel enters, and a discharge channel may be arranged to receive the liquid from the grooves 8 and the 10° portion of the reel which is free of the deflecting means. By providing a plurality of spaced axial slits, a discharge channel over each of the slits, and a liquid feed pipe at the reel entrance with respect to each deflecting means, it is possible to subject a helical band of the filamentary material to a plurality of different treating liquids spaced peripherally of the helix. The housing 4 may be provided with heating means 11, which is shown as an electrical heating coil embedded therein though the housing 4 may be in the form of a jacket to which either heating or cooling fluids may be applied to control the temperature of the liquid being applied to the filamentary material.

Figure 2 is a view similar to Figure 1, showing an adaptation of the invention to a reel of considerably larger length on which the filamentary material may be subjected to a plurality of different liquids in succession at axially spaced zones of the reel. For example, a yarn-like multiple-filament bundle proceeding from a spinneret and coagulating bath (not shown) may be received on one end of the reel 13 rotating on shaft 12, and may be advanced first through a washing zone or stage fed by pipe 6a with washing liquid, such as water, which zone is surrounded by a deflector surface 7a and limited by collecting grooves 8a within the housing 14 discharging through pipes 10a.

The corresponding elements of succeeding stages are designated by reference numerals followed by succeeding letters of the alphabet. Illustratively, a desulfurizing liquid such as a solution of sodium sulfide, may be introduced into pipe 6b, a bleaching solution may be introduced into pipe 6c, a solution for neutralizing the residual bleach solution in the filamentary material may be introduced into pipe 6d, a soap or other finish may be introduced into pipe 6e, and heated air or steam may be introduced into pipe 6f for drying the material partially or completely. Suction may be applied to pipe 10f to assure removal of such heated medium. Additional stages may be used, if desired, such as additional washing stages intermediate those mentioned above.

It is obvious that a reel having more or less liquid treatment stages may be used for processing filamentary materials during their spinning from other materials, such as cuprammonium cellulose solutions, protein solutions, resin solutions and the like. Of course, the processing system is also applicable to the treatment of natural or artificial filamentary material in the form of yarns, tows and the like, for purposes entirely unrelated to the after-treatment of freshly spun artificial filaments. Thus, the technique may be used for the application of textile conditioning agents, such as softeners, lubricants, sizes and twist-setting agents, to prepare the filamentary material for subsequent textile-fabricating operations, such as weaving, knitting and the like. Such treatments may be applied on a single stage reel, such as that of Figure 1, and this treatment may be followed by rinsing or other operations on a subsequent reel of either single-stage type or multiple-stage type, as in Figure 2.

While the processing reel is preferably disposed with its axis of rotation horizontal, it may be tilted at any angle to the horizontal, including a vertical disposed as shown in Figure 2a. As there shown, the reel 13' is arranged for a three-stage liquid treatment. The feed pipes 16a, 16b, and 16c direct the treating liquid near the upper portions of the several treating sections. The lower of each of the pairs of collecting grooves 18a, 18b, and 18c may have numerous spaced radial apertures 19 whose outer openings may be surrounded by sealing rings 20 connected to exhaust pumps 21 to assure removal of liquid from the respective treating zones and to prevent its overflow into the next zone therebelow. A drip pan 22 may be provided with a wall whose internal upper portion surrounds the lower edge of the housing 14' and the filamentary material may pass through a guide eye 23 of porcelain or other material in the wall of the drip pan. Instead of leading the filamentary material to the top and withdrawing it from the bottom, the reel 13' may be arranged to advance the material upwardly from the bottom to be discharged from the top, in which case liquid treatment on the countercurrent principle is accomplished.

Figure 4 shows a modification of the housing which may be used to obtain countercurrent liquid treatment action. The housing 24 shown is intended to be used with the reel 3 in the same relationship as shown in Figure 1, that is, with the thread advancing from right to left. The liquid is introduced by the pipe 26 at a point near the thread discharge end of the deflector surface 27 which is constituted of a helical groove having a right-handed screw-thread relation and extending substantially entirely across the space between the collecting grooves 28 connected with discharge pipes 30. The arrangement of the helical groove as shown, serves to cause the main portion of the liquid to be displaced toward the groove 28 at the right of the device as seen in Figure 4, in spite of the normal tendency of the liquid to advance in the direction of the thread. The helical groove may take the form of a serrated thread instead of a square-cut thread.

Figures 5 and 5a show another form of deflecting surface 37 in a housing 34 having the collecting grooves 38. The surface 37 is constituted of a plurality of grooves 39. These grooves may be disposed at a low helix angle as shown to impart the desired directional influence to the liquid. The angle shown causes the liquid to travel from left to right when a reel, such as reel 3, is rotated within the housing in counterclockwise direction as viewed in Figure 5a. Liquid treatment on the countercurrent principle can thus be obtained by introducing the liquid into the system at the left and the filamentary material at the right. There are preferably no lands intervening between the grooves 39, and while the shape of the groove may be various, a preferred type is shown in Figure 5a in which a gently sloped side 40 gradually blends into a steeply sloped side 41, the reel within being rotated in a direction from the gently to the steeply sloped side, as shown by the arrow in Figure 5a.

Figure 6 shows a housing 44 having a deflecting surface 47 constituted of a diamond-patterned knurling. Collecting grooves 48 are provided at each end.

Figure 7 shows another method of obtaining directed flow axially of the processing reel 3'. Instead of grooving, rifling or knurling the interior deflecting surface, this surface 7' may be substantially smooth but conical, or more accurately, frusto-conical with the larger internal diameter spaced axially from the smaller diameter in the direction in which it is desired that the liquid flow. The ends of the deflecting surface 7' may be joined with the collecting grooves 8'.

Figure 8 shows another arrangement for directing flow in which gravity is utilized. In this figure, the deflecting surface 7" is cylindrical, but with its axis sloped or inclined with respect to the substantially horizontal axis of the processing reel 3", the slope being directed downwardly toward the end of the reel toward which flow is desired.

Figure 9 shows a transverse cross-section of the longitudinally extending interdigitating bar members of the reel 3 which effect longitudinal or axial advance of the thread thereover. At high speeds of rotation of the reel, these bar members 3a cut across the rebounding spray of liquid at sufficiently high velocity to prevent free passage of the spray through the intermediate spaces between the bar members, and upon the contacting of the liquid spray with the radial sides of the bar members, there is substantially immediately developed a centrifugal force causing the liquid carried by the bar members to flow radially outwardly. To increase the assurance that no liquid will penetrate to the interior of the reel 3, the radial depth of the bar members may be made as large as possible without interfering with their relative motion. Where, however, it is not desired or convenient to make the bar members of increased depth and the operating speed is such that there is a tendency for the liquid spray to penetrate to the interior of the reel by virtue of failure of the bar members 3a to cut across the spray with sufficient rapidity, bar members 3b and 3c of the shape shown in Figure 10 may be used in the reel 3. The radial side surfaces of the bar members 3b and 3c are provided with more or less serrated ribs extending longitudinally of the bar members. The ribs of one set of bar members 3b may be radially offset from those of the bar members 3c which alternate and interdigitate therebetween, so that there is spacial interlapping between the opposed ribs of adjacent bar members to form a labyrinthine passage therebetween. The labyrinthine nature of the passage prevents penetration of the liquid spray into the interior of the reel, since the spray must strike the ribs and be thrown outwardly along the bar members by centrifugal force.

Figure 11 illustrates a reel 53 on shaft 52. The filamentary material F is received on the reel at its small end and after advancing to a point within the housing 54 is gradually stretched as it progressively advances over a tapered portion of the reel, after which it may be relaxed somewhat by passage over a section of the reel having a diminishing taper. During the stretching portion of the processing, the filamentary material may be subjected to a plasticizing fluid, such as steam or hot water, introduced toward the small end of the tapered section by pipe 56a. Collecting grooves 58a serve to direct the effluent into discharge pipes 60a. A rinsing liquid may be provided during the relaxing portion of the processing on the reel by pipe 56b, collecting grooves 58b and discharge pipes 60b serving to remove the liquid from the second stage of treatment.

The stretching may not be followed immediately or at any subsequent stage by a relaxing stage. It may be combined with relaxing or any other precedent or subsequent processing treatment on the same reel of multiple stage character or on other reels of either single or multiple stage character. Again the drying section of a reel may be provided with a tapered section diminishing in diameter to allow shrinkage to occur during drying. While the surfaces 57a and 57b are frusto-conical and correspond closely to the taper of the reel adjacent them, they may be tilted at an angle with respect to the tapered reel surfaces (as shown at 57' in Figure 11a), or they may in fact be substantially cylindrical (as at 57a" in Figure 11b) or they may be constituted of a plurality of stepped cylindrical surfaces (as at 57a'" in Figure 11c). Tapered or cylindrical deflecting surfaces which are stepped like 57a'" may be used with a cylindrical reel in place of the smooth tapered or inclined cylindrical deflecting surfaces shown in Figures 7 and 8, for the purpose of imparting an axial component to the direction of flow of the liquid.

The thread-carrying periphery of the thread-advancing device in all the embodiments of Figures 1 to 11c is generally defined by a surface of revolution whose generatrix is a line having straight-line terminal portions parallel to the axis of rotation of the helix carried thereon.

Figure 12 shows a transverse cross-section of a spinning machine in which the filamentary material issuing from a spinneret 73 in a spinning bath 72 passes vertically upwardly to a thread-storage, thread-advancing device 75, and then passes vertically down to the receiving end of the first of a series of stepped single-stage treating devices 77a, b, c, etc., of the type shown in Figures 1 and 3, on which successive liquid treatments, such as washing, desulfurizing, bleaching, soaping and so forth, are respectively performed. From the last of such liquid-treating devices, the filamentary material may pass to a drying device 77n which may be of the same structure as the liquid-treating devices, or may be any conventional thread-storage thread-advancing reel equipped for drying the filamentary material. From the drying device, the material may pass to any suitable collecting device 78.

In the arrangement of Figures 13 and 14, the filamentary material proceeds upwardly from the spinneret 83 through the spinning bath 82 to a thread-storage, thread-advancing device 84, through a stretch-bath 85 to another thread-storage, thread-advancing device 86 from which it descends in succession to a series of superposed single-stage processing devices 87a to 87n, such as that of Figures 1 and 3. The material passes in zigzag fashion from left to right on the first reel, from right to left on the next and so on alternately through the series on which the sequence of liquid-treating operations may be performed. From 87n the material may descend to a thread-storage, thread-advancing device 88 equipped for drying the material from which it descends to a suitable collecting device 89.

In the embodiments of Figures 12 to 14, thread-guides may be placed adjacent the points of approach and departure of the filamentary material with respect to the thread-advancing devices or reels to control any tendency of the material to whip from side to side or to balloon.

It is to be understood that changes and variations may be made without departing from the spirit and scope of the invention as defined by the appended claims.

We claim:

1. The method of treating filamentary material with a liquid comprising the steps of passing the material to, through and from a helical path at sufficiently high velocity to throw the liquid off the material constantly from all points around the helix by centrifugal force thereby to rapidly remove any liquid applied thereto, continuously delivering the liquid to convolutions of the helix in an intermediate zone thereof to thereby rapidly replace the liquid removed from the material, confining the liquid thrown off within a region adjacent the intermediate zone and preventing the liquid thrown off from migrating to the end portions of the helix.

2. The method of treating filamentary material with a liquid comprising the steps of passing the material through a generally helical path at sufficiently high velocity to throw the liquid therefrom by centrifugal force, delivering the liquid to the material as it passes through the helical path, and deflecting the liquid thrown from the filamentary material back to the helix.

3. The method of treating filamentary material with a liquid comprising the steps of passing the material through a generally helical path at sufficiently high velocity to throw the liquid therefrom by centrifugal force, delivering the liquid to the material as it passes through the helical path, and deflecting the liquid thrown from the filamentary material back to the helix and imparting a component of motion toward one end of the helix to a substantial part of the liquid during such deflection.

4. The method of treating filamentary material with a liquid comprising the steps of passing the material through a generally helical path at sufficiently high velocity to throw the liquid therefrom by centrifugal force, delivering the liquid to the material as it passes through the helical path, deflecting the liquid thrown from the material back to the helix and at least partially directing the deflected liquid away from the material discharge end of the path so that the liquid continually plays upon a zone of the helix and moves generally through that zone toward the material entrance end of the path, and withdrawing the liquid from the zone adjacent its end nearer the material entrance end of the path.

5. The method of treating filamentary material with a liquid comprising the steps of passing the material through a generally helical path having an approximately horizontal axis at sufficiently high velocity to throw the liquid therefrom by centrifugal force, delivering the liquid to the material as it passes through the helical path, deflecting the liquid thrown from the material back to the helix and at least particularly directing the deflected liquid away from the material discharge end of the path so that the liquid continually plays upon a zone of the helix and moves generally through that zone toward the material extrance end of the path, and withdrawing the liquid from the zone adjacent its end nearer the material entrance end of the path.

6. The method of treating filamentary material with a liquid comprising the steps of passing the material through a generally helical path having an approximately vertical axis at sufficiently high velocity to throw the liquid therefrom by centrifugal force, delivering the liquid to the material as it passes through the helical path, deflecting the liquid thrown from the material back to the helix so that the liquid continually plays upon a zone of the helix and moves under the influence of gravity generally downwardly through that zone, and withdrawing the liquid from the zone adjacent its lower end.

7. The method of treating filamentary material with a liquid, comprising the steps of passing the material upwardly through a generally helical path having an approximately vertical axis at sufficiently high velocity to throw the liquid therefrom by centrifugal force, delivering the liquid to the material as it passes through the helical path adjacent the upper end of the path, deflecting the liquid thrown from the material back to the helix so that the liquid continually plays upon a zone of the helix and moves under the influence of gravity generally downwardly through that zone toward the material entrance end of the path, and withdrawing the liquid from the zone adjacent its lower end.

8. The method of treating filamentary material with a liquid comprising the steps of passing the material through a generally helical path at sufficiently high velocity to throw the liquid therefrom by centrifugal force, delivering the liquid to the material as it passes through a zone of the helical path, deflecting the liquid thrown from the filamentary material back to the helix, and withdrawing the liquid from the zone adjacent its ends.

9. The method of treating filamentary material with a liquid comprising the steps of passing the material through a generally helical path at sufficiently high velocity to throw the liquid therefrom by centrifugal force, delivering the liquid to the material as it passes through the helical path, deflecting the liquid thrown from the filamentary material back to the helix, imparting a component of motion toward one end of the helix to a substantial part of the liquid during such deflection, and withdrawing the liquid from the helix adjacent that end of the zone toward which the liquid moves.

10. The method of treating filamentary material with a liquid comprising the steps of passing the material through a generally helical path having an axis inclined to the horizontal at sufficiently high velocity to throw the liquid therefrom by centrifugal force, delivering the liquid to the material as it passes through the helical path, deflecting the liquid thrown from the material back to the helix so that the liquid continually plays upon a zone of the helix and moves under the influence of gravity generally downwardly through that zone, and withdrawing the liquid from the zone adjacent its lower end.

11. The method of treating filamentary material with a liquid comprising the steps of passing the material upwardly through a generally helical path having an axis inclined to the horizontal at sufficiently high velocity to throw the liquid therefrom by centrifugal force, delivering the liquid to the material as it passes through the helical path adjacent the upper end of the path, deflecting the liquid thrown from the material back to the helix so that the liquid continually plays upon a zone of the helix and moves under the influence of gravity generally downwardly through that zone toward the material entrance end of the path, and withdrawing the liquid from the zone adjacent its lower end.

12. Apparatus for treating filamentary material with liquids comprising a device, having a thread-carrying periphery generally defined by a surface of revolution whose generatrix is a line having straight-line terminal portions parallel to the axis of rotation, for advancing continuous filamentary materials through a helical path on said periphery, means for applying a liquid to the material at a portion of the helix, means for driving the device, and means arranged about at least a portion of the helix including that portion receiving the liquid directly from the liquid-applying means for deflecting liquid thrown from the filamentary material back to the helix of material, said device having at least an end portion of each of the straight-line terminal portions of its thread-carrying periphery exposed to permit free passage of the filamentary material continuously to and from the helix on the device.

13. The apparatus of claim 12 in which the exposed portions of the periphery are cylindrical.

14. Apparatus for treating filamentary material with liquids comprising a device, having a thread-carrying periphery generally defined by a surface of revolution whose generatrix is a line having straight-line terminal portions parallel to the axis of rotation, for advancing continuous filamentary material through a helical path on said periphery, means for applying a liquid to the material at a portion of the helix, means for driving the device at sufficient speed to throw the liquid off the filamentary material by centrifugal force, and means surrounding the helix including that portion receiving the liquid directly from the liquid-applying means for deflecting liquid thrown from the filamentary material back to the helix of material, said device having at least an end portion of each of the straight-line terminal portions of its thread-carrying periphery exposed to permit free passage of the filamentary material continuously to and from the helix on the device.

15. Apparatus for treating filamentary material with liquids comprising a device, having a thread-carrying periphery generally defined by a surface of revolution whose generatrix is a line having straight-line terminal portions parallel to the axis of rotation, for advancing continuous filamentary material through a helical path on said periphery, means for applying a liquid to the material at a portion of the helix, means for driving the device at sufficient speed to throw the liquid off the filamentary material by centrifugal force, means comprising an annular member having an internal surface surrounding the helix including that portion receiving the liquid directly from the liquid-applying means for deflecting substantially all of the liquid thrown to the surface from the filamentary material back to the helix of the material, said device having at least an end portion of each of the straight-line terminal portions of its thread-carrying periphery exposed to permit free passage of the filamentary material continuously to and from the helix on the device, said deflecting surface being disposed relative to the helix to impart a component of motion to a substantial portion of the deflected liquid to move the liquid generally through a predetermined zone of the helix toward one end therof.

16. Apparatus for treating filamentary material with liquids comprising a device, having a thread-carrying periphery generally defined by a surface of revolution whose generatrix is a line having straight-line terminal portions parallel to the axis of rotation, for advancing continuous filamentary material through a helical path on said periphery, means for applying a liquid to the material at a portion of the helix, means for driving the device at sufficient speed to throw the liquid off the filamentary material by centrifugal force, means comprising a stationary annular member having an internal surface surrounding the helix including that portion receiving the liquid directly from the liquid-applying means for deflecting substantially all of the liquid thrown to the surface from the filamentary material back to the helix of material, said deflecting surface being disposed relative to the helix to impart a component of motion to a substantial portion of the deflected liquid to move the liquid generally through a predetermined zone of the helix toward one end thereof, and means just beyond that end of the zone to withdraw the liquid from the helix, said device having at least an end portion of each of the straight-line terminal portions of its thread-carrying periphery exposed to permit free passage of the filamentary material continuously to and from the helix on the device.

17. Apparatus in accordance with claim 16 in which the internal surface of the annular member is conical.

18. Apparatus in accordance with claim 16 in which the internal surface of the annular member is cylindrical and has its axis inclined to that of the helix.

19. Apparatus in accordance with claim 16 in which the internal surface of the annular member has helical grooves provided thereon.

20. Apparatus for treating filamentary material with liquids comprising a device, having a thread-carrying periphery generally defined by a surface of revolution whose generatrix is a line having straight-line terminal portions parallel to the axis of rotation, for advancing continuous filamentary material through a helical path on said periphery, means for applying a liquid to the material at a portion of the helix, means for driving the device at sufficient speed to throw the liquid off the filamentary material by centrifugal force, means arranged about a portion of the helix including that portion receiving the liquid directly from the liquid-applying means comprising a surface for deflecting substantially all of the liquid thrown to the surface back to the helix and for causing the liquid to continually play on the material in a predetermined zone of the helix, and means at both ends of the zone for receiving and withdrawing the liquid from the helix, said device having at least an end portion of each of the straight-line terminal portions of its thread-carrying periphery exposed to permit free passage of the filamentary material continuously to and from the helix on the device.

21. Apparatus for treating filamentary material with liquids comprising a thread-advancing reel, having a thread-carrying periphery generally defined by a surface of revolution whose generatrix is a line having straight-line terminal portions parallel to the axis of rotation, for advancing continuous filamentary material through a helical path on said periphery, means for applying a liquid to the material at a portion of the helix, means for driving the reel at sufficient speed to throw the liquid off the filamentary material by centrifugal force, means comprising a stationary annular member having an internal surface surrounding the helix including that portion receiving the liquid directly from the liquid-applying means for deflecting substantially all of the liquid thrown to the surface from the filamentary material back to the helix of material, said deflecting surface being disposed relative to the helix to impart a component of motion to a substantial portion of the deflected liquid to move the liquid generally through a predetermined zone of the helix toward one end thereof and means just beyond both ends of the zone to withdraw the liquid from the helix, said reel having at least an end portion of each of the straight-line terminal portions of its thread-carrying periphery exposed adjacent each end of the helix carried thereon to permit free passage of the filamentary material continuously to and from the helix on the reel.

References Cited in the file of this patent

UNITED STATES PATENTS

| | | |
|---|---|---|
| 403,305 | Sutcliffe | May 14, 1889 |
| 1,418,136 | Dreaper | May 30, 1922 |
| 1,564,503 | Wolfer | Dec. 8, 1925 |
| 1,990,617 | Sanders et al. | Feb. 12, 1935 |
| 2,042,529 | Huttinger | June 2, 1936 |
| 2,078,339 | Pfannenstiel et al. | Apr. 7, 1937 |
| 2,145,281 | Walters | Jan. 31, 1939 |
| 2,150,309 | Atwill | Mar. 14, 1939 |
| 2,189,195 | Burkholder | Feb. 6, 1940 |
| 2,194,470 | Hartmann | Mar. 26, 1940 |
| 2,203,793 | Lovett | June 11, 1940 |
| 2,207,789 | Ellis | July 16, 1940 |
| 2,225,641 | Knebusch | Dec. 24, 1940 |
| 2,226,286 | Knebusch | Dec. 24, 1940 |
| 2,247,389 | Knebusch et al. | July 1, 1941 |
| 2,287,031 | Frohwein | June 23, 1942 |
| 2,294,902 | Gram | Sept. 8, 1942 |
| 2,319,812 | Gram | May 25, 1943 |
| 2,357,909 | Ridge | Sept. 12, 1944 |
| 2,368,386 | Tarbox | Jan. 30, 1945 |
| 2,416,533 | Naumann | Feb. 25, 1947 |
| 2,513,381 | Truitt | July 4, 1950 |

FOREIGN PATENTS

| | | |
|---|---|---|
| 767,084 | France | Apr. 23, 1934 |